(No Model.) 2 Sheets—Sheet 2.

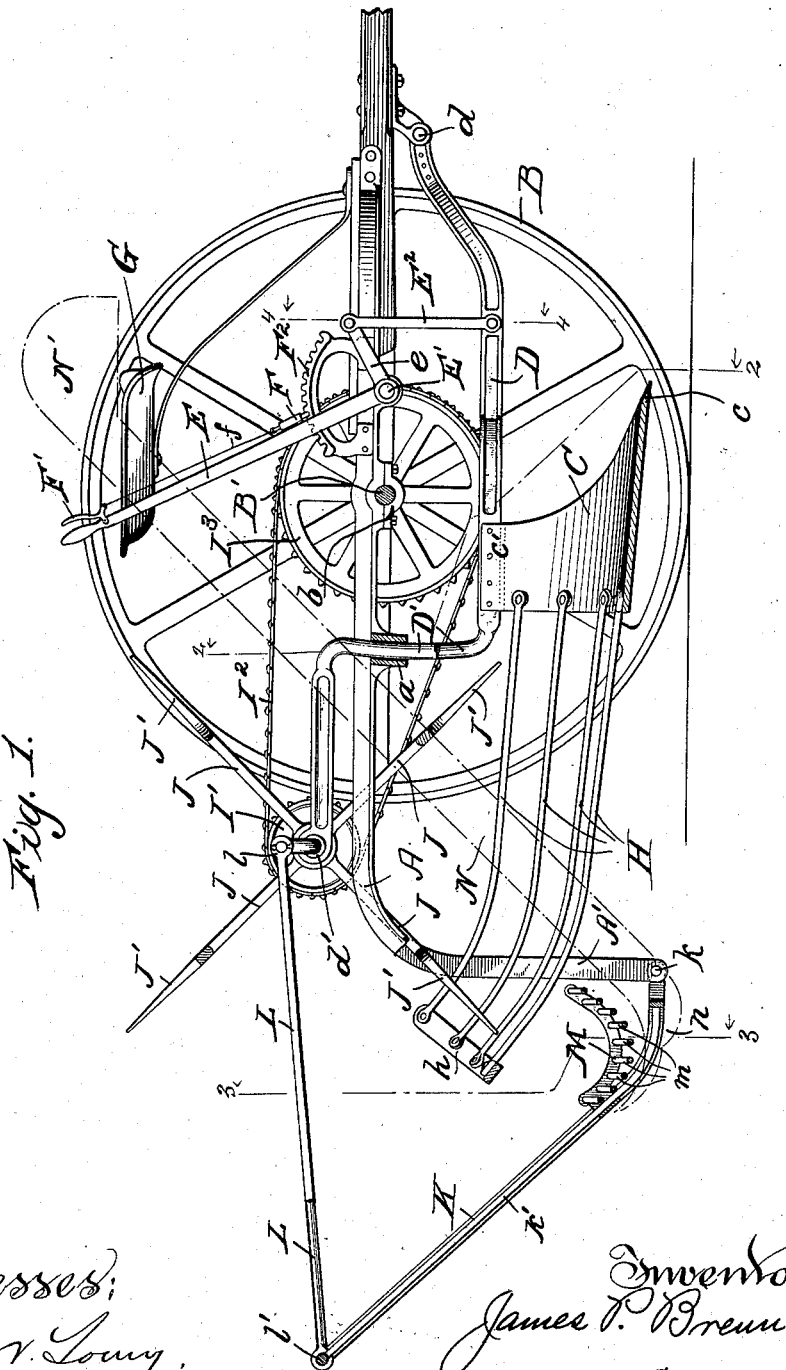

J. P. BRENNAN.
POTATO HARVESTER.

No. 567,846. Patented Sept. 15, 1896.

Witnesses:
Geo. W. Young.
E. E. Chapin

Inventor:
James P. Brennan
By John E. Wiles
Attorney

UNITED STATES PATENT OFFICE.

JAMES P. BRENNAN, OF ELBA, WISCONSIN.

POTATO-HARVESTER.

SPECIFICATION forming part of Letters Patent No. 567,846, dated September 15, 1896.

Application filed July 1, 1895. Serial No. 554,626. (No model.)

*To all whom it may concern:*

Be it known that I, JAMES P. BRENNAN, a citizen of the United States, residing at the town of Elba, county of Dodge, State of Wisconsin, have invented a certain new and useful Improvement in Potato-Harvesters; and I declare the following to be a full, clear, and exact description of the invention, such as will enable others skilled in the art to which it pertains to make and use the same, reference being had to the accompanying drawings, which form a part of this specification.

My invention relates to new and useful improvements in potato-harvesting machines; and it consists in the matters hereinafter described, and pointed out in the appended claims.

Figure 4:
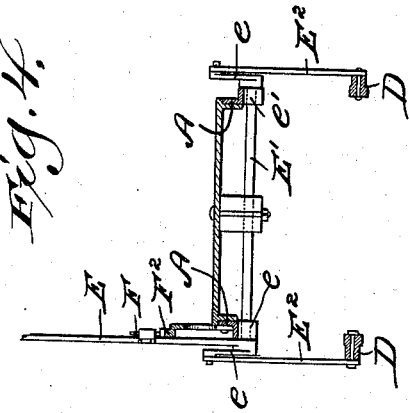
Figure 3:
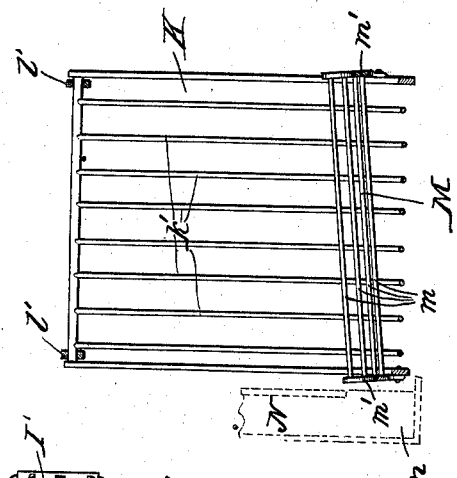
Figure 2:
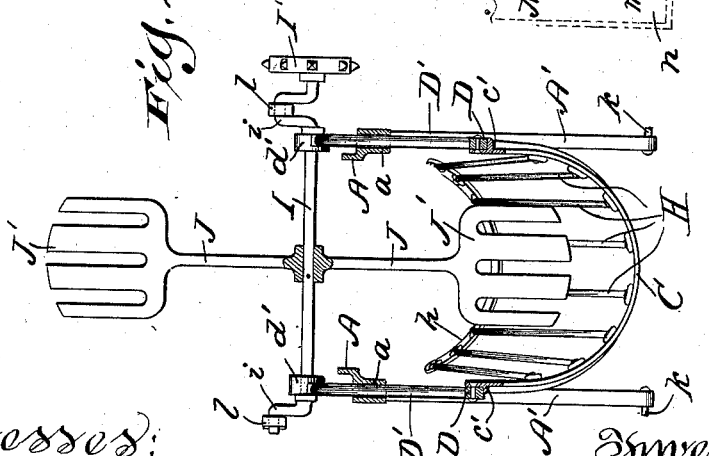

In the accompanying drawings, illustrating my invention, Figure 1 is a longitudinal sectional view of a potato-harvesting machine constructed in accordance with my invention. Fig. 2 is a transverse sectional view of the same, taken on line 2 2 of Fig. 1. Fig. 3 is a detail transverse sectional view taken on line 3 3 of Fig. 1. Fig. 4 is a detail transverse sectional view taken on line 4 4 of Fig. 1.

Referring by letter to said drawings, A designates the machine-frame, which may be of any convenient form, and which is supported upon any suitable form of traction-wheels B B, secured to a transverse shaft B', which has a revoluble engagement with the frame A, as by means of bearings $b$.

C designates the digging or excavating shovel or plow for unearthing the potatoes, said shovel or plow terminating in a sharp cutting edge $c$. The shovel or plow C is rigidly secured to a suitable frame D, as indicated at $c'$ $c'$, said frame D having a pivotal support at its forward end upon the main frame A, as indicated at $d$.

Any suitable means may be provided for raising and lowering the frame D and the shovel or plow C, such, for instance, as the lever E, operatively connected with a transverse shaft E', to which are secured suitable crank-arms $e$ $e$, and these crank-arms are connected by means of links $E^2$ $E^2$ with the frame D.

A suitable detent F is provided upon the lever E and is connected, by means of a suitable rod $f$, with an operating-handle F', adjacent to the handle of said lever, and said detent is arranged to engage with a toothed arc $F^2$, so as to retain said lever in its adjusted position in a familiar manner.

The transverse shaft E' has a revoluble engagement with bearings $e'$ $e'$ upon the main frame A.

The lever E is conveniently located at one side of the driver's seat G, so as to be within easy reach of the driver.

To the rear end of the shovel or plow C is secured a suitable grating conveniently formed from a number of longitudinal slats or rods H H, which are connected together at their rear ends by a transverse curved strip or plate $h$.

Upon the rear end of the frame D is provided a transverse shaft I, having a revoluble engagement within suitable bearings $d'$ $d'$ in said frame, and upon one end of said shaft I is secured a suitable sprocket-wheel I', having an operative engagement by means of a sprocket-chain $I^2$ with a drive-wheel $I^3$ upon the drive-shaft B'.

To the shaft I are secured a suitable number of radial arms J J, terminating in sweeps J' J', arranged to travel over the rear end of the screen formed by the bars or slats H H. The rear end of this screen is curved upwardly, as shown in Figs. 1 and 2, so as to enable the extremities of the sweeps J' J' to travel parallel thereto.

An inclined screen K has a pivotal support, as at $k$ $k$, upon the lower ends of depending arms A' A' upon the main frame A, as shown, said screen being constructed from a plurality of bars $k'$ $k'$. Suitable connecting-rods L L are connected, as at $l$ $l$, with cranks $i$ $i$, formed upon the transverse shaft I, as shown more particularly in Figs. 1 and 2, and said connecting-rods are connected at their other ends with the upper end of the inclined screen K, as at $l'$ $l'$ in Figs. 1 and 3.

Adjacent to the lower end of the inclined screen K is secured a transversely-slatted trough or screen M, formed from a plurality of slats or bars $m$ $m$, as shown, said transverse trough or screen being supported upon the lower end of the screen K by means of suitable end pieces $m'$ $m'$, as illustrated in Figs. 1 and 3.

The frame D may have any suitable engagement with the main frame A, as by means of the bearings a a, within which upwardly-curved portions d' d' of said frame are arranged to slide.

It follows from this construction that the machine being placed astride of the row of potatoes to be unearthed may be advanced by means of a horse or team, and the shovel or plow C having been adjusted to the proper height will penetrate the earth to a sufficient depth to dig up or unearth the potatoes, together with the adherent earth. The potatoes and the adherent earth will be forced backward by the advancement of the machine and will pass from the shovel or plow C onto the screen H, where the loose dirt will be permitted to sift through the screen and to drop back again to the earth.

The advancement of the machine will impart a rotary motion to the wheel $I^3$, and by means of the chain $I^2$ said motion will be communicated to the wheel I' and thus to the transverse shaft I. The rotation of the shaft I will cause the sweeps J' J' to pass more or less rapidly from the rear part of the screen H in an obvious manner, and when the potatoes, together with the adherent earth, come within reach of said sweeps they will be raked or swept rearwardly with more or less rapidity and discharged from the rear end of the screen H against the inclined screen K. The screen K, being pivotally supported at its lower and forward end, as described, and connected by the connecting rods or bars L L with the cranks $i\ i$ upon the shaft I, will be given a vibrating movement upon its pivotal supports $k\ k$, thus tending to agitate the patatoes and to effect a further separation of the adherent earth therefrom. The potatoes will roll by gravity downwardly upon the inclined screen K and will be received upon the transversely-inclined through or screen M. In this manner the potatoes will be effectually separated from the dirt and the cleaned potatoes dropped into the transversely-inclined trough M, from which they will be discharged in an obvious manner at one side of the machine in a condition to be readily gathered into suitable receptacles.

If desired, I may employ a conveyer or elevator which may be of any one of a large number of familiar forms of construction, said conveyer N being arranged obliquely, as in Fig. 1, and having its lower end $n$ arranged in a position to receive the potatoes discharged from the lower end of the trough or screen M, and the upper end N' of said conveyer or elevator being arranged to discharge into any suitable receptacle which may be carried by the machine.

My improved machine may be made very strong and at the same time durable and light enough in weight to enable it to be readily operated by a single team without undue exertion.

With my improved machine the potatoes may be very satisfactorily dug or unearthed, thoroughly separated from adherent earth, and deposited in rows ready to be picked up, or when the conveyer or elevator is employed delivered into a suitable receptacte carried upon the machine.

Having thus described my invention, what I claim as new, and desire to secure by Letters Patent of the United States, is—

1. A potato-harvester comprising an unearthing or digging shovel or plow, a screen in rear of said shovel or plow, a revolubly-supported transverse shaft, a plurality of radial arms secured thereto, and provided with sweeps adapted to move past or over the rear end of said screen, suitable carrying-wheels, an operative connection between said transverse shaft and the shaft of the carrying-wheel, an oblique screen pivoted to the machine-frame at its lower end, in rear of the first-mentioned screen, and an operative connection between the upper end of said screen and cranks upon said transverse shaft to give a vertical vibration to said screen, substantially as described.

2. A potato-harvester comprising an unearthing or digging shovel or plow, a screen in rear of said shovel or plow, a revolubly-supported transverse shaft, a plurality of radial arms secured thereto, and provided with sweeps adapted to move past or over the rear end of said screen, suitable carrying-wheels, an operative connection between said transverse shaft and the shaft of the carrying-wheel, an oblique vibrating screen in rear of the first-mentioned screen, an operative connection between said vibrating screen and cranks upon said transverse shaft, and a transverse oblique screen or trough secured to the lower end of said vibrating screen, substantially as described.

3. A potato-harvester comprising a main frame provided with carrying-wheels, a movable frame pivotally secured to said main frame, a plow or shovel secured to said movable frame, a slatted screen extending rearwardly from the said plow or shovel, a transverse shaft upon said movable frame, sweeps secured to said transverse shaft and adapted to move over or past the rear end of said screen, a drive-wheel upon said shaft, an operative connection between said wheel and an actuating-wheel upon the axis of the carrying-wheels, an oblique vibrating screen in rear of the first-mentioned screen, a transversely oblique trough or screen secured to said vibrating screen adjacent to its lower end, and an operative connection between the free end of said vibrating screen and cranks upon the transverse shaft, substantially as described.

4. A potato-harvester comprising a main frame provided with carrying-wheels, a movable frame pivotally secured to said main frame, a plow or shovel secured to said movable frame, a slatted screen extending rearwardly from the said plow or shovel, a transverse shaft upon said movable frame, sweeps secured to said transverse shaft and adapted to move over or past the rear end of said screen, a drive-wheel upon said shaft, an operative connection between said wheel and an actuating-wheel upon the axis of the carrying-wheels, suitable means for raising or lowering said movable frame together with the shovel or plow, the screen and the sweeps, an oblique screen pivotally supported at its lower end upon the main frame, in rear of the first-mentioned screen, and an operative connection between the free end of said vibrating screen and cranks upon said shaft, substantially as described.

5. A potato-harvester comprising a main frame provided with carrying-wheels, a movable frame pivotally secured to said main frame, a plow or shovel secured to said movable frame, a slatted screen extending rearwardly from the said plow or shovel, a transverse shaft upon said movable frame, sweeps secured to said transverse shaft and adapted to move over or past the rear end of said screen, a drive-wheel upon said shaft, an operative connection between said wheel and an actuating-wheel upon the axis of the carrying-wheels, suitable means for raising or lowering said movable frame together with the shovel or plow, the screen and the sweeps, an oblique vibrating screen supported upon the main frame, in rear of the first-mentioned screen, an operative connection between the free end of said vibrating screen and cranks upon said shaft, and a transverse oblique screen or trough secured to the lower end of said vibrating screen, substantially as described.

6. A potato-harvester comprising the main frame A, carrying-wheels B, the transverse shaft B', the shovel or plow C secured to the pivoted frame D, lever E for raising and lowering said frame, the screen H secured to the rear end of the shovel or plow, the transverse cranked shaft I secured to the rear end of the movable frame, the oblique vibrating screen K secured to the main frame, the transverse oblique trough or screen M secured to the lower end of the vibrating screen K, and the rods L L connecting the free end of said screen K with the cranks upon said transverse shaft I, substantially as described.

In testimony whereof I sign this specification in the presence of two witnesses.

JAMES P. <sup>his</sup> × <sub>mark</sub> BRENNAN.

Witnesses:
   J. R. GOFF,
   L. E. EVERSON.